No. 614,001. Patented Nov. 8, 1898.
R. P. JARVIS.
ROTARY ENGINE.
(Application filed Feb. 18, 1898.)

(No Model.) 8 Sheets—Sheet 1.

WITNESSES:
INVENTOR
R. P. Jarvis.
BY
ATTORNEYS.

No. 614,001. Patented Nov. 8, 1898.
R. P. JARVIS.
ROTARY ENGINE.
(Application filed Feb. 18, 1898.)
(No Model.) 8 Sheets—Sheet 4.

WITNESSES:
INVENTOR
R. P. Jarvis
BY
ATTORNEYS.

THE NORRIS PETERS CO., PHOTO-LITHO., WASHINGTON, D. C.

No. 614,001. Patented Nov. 8, 1898.
R. P. JARVIS.
ROTARY ENGINE.
(Application filed Feb. 18, 1898.)

(No Model.) 8 Sheets—Sheet 5.

No. 614,001. Patented Nov. 8, 1898.
R. P. JARVIS.
ROTARY ENGINE.
(Application filed Feb. 18, 1898.)
(No Model.) 8 Sheets—Sheet 6.

No. 614,001.

R. P. JARVIS.
ROTARY ENGINE.
(Application filed Feb. 18, 1898.)

Patented Nov. 8, 1898.

(No Model.)

WITNESSES:

INVENTOR
R. P. Jarvis
BY
ATTORNEYS.

UNITED STATES PATENT OFFICE.

REUBEN PALMER JARVIS, OF SMITH CENTRE, KANSAS.

ROTARY ENGINE.

SPECIFICATION forming part of Letters Patent No. 614,001, dated November 8, 1898.

Application filed February 18, 1898. Serial No. 670,819. (No model.)

*To all whom it may concern:*

Be it known that I, REUBEN PALMER JARVIS, of Smith Centre, in the county of Smith and State of Kansas, have invented a new and Improved Rotary Engine, of which the following is a full, clear, and exact description.

The invention relates to rotary engines such as shown and described in Letters Patent of the United States No. 602,703, dated April 19, 1898.

The object of the invention is to provide a new and improved rotary engine of the type indicated which is simple and durable in construction, very effective in operation, and arranged to utilize the motive agent expansively and to the fullest advantage, the friction of the working parts being reduced to a minimum and leakage of steam completely prevented.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 2:
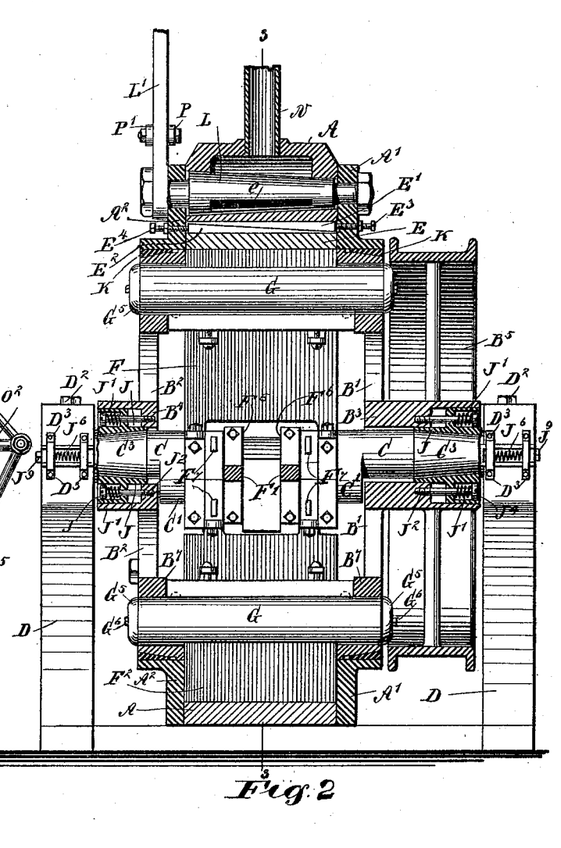
Fig. 2 is a longitudinal sectional elevation of the same on the line 2 2 of Fig. 1.
Figure 4:
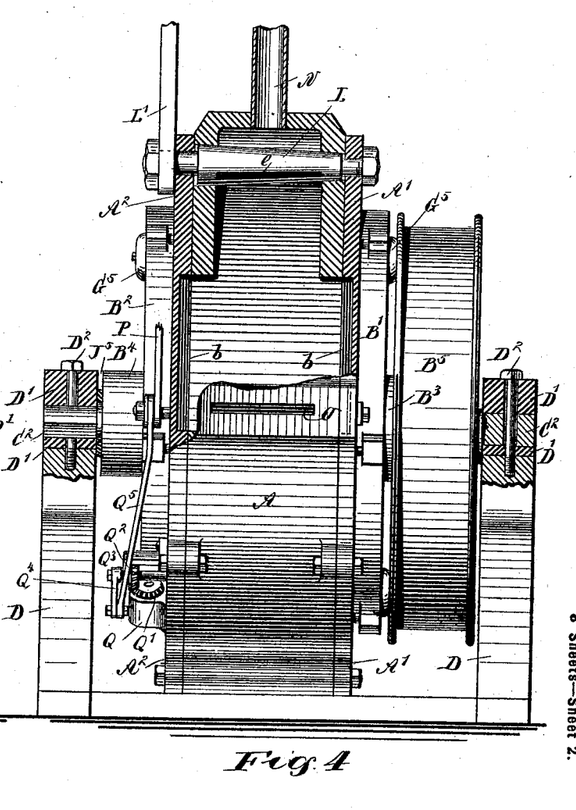
Fig. 4 is a side elevation of the same with parts in section.

The improved rotary engine is provided with a cylinder $A$, having ring-shaped cylinder-heads $A'$ $A^2$, and in said cylinder is mounted eccentrically a piston $B$, made ring-shaped and provided with spiders $B'$ $B^2$, having hubs $B^3$ $B^4$, mounted to rotate loosely on a shaft $C$, having its hexagonal ends $C^2$ secured in bearings $D'$, removably held in standards $D$ and secured therein, together with the hexagonal ends $C^2$, by bolts $D^2$, as is plainly illustrated in the drawings, special reference being had to Fig. 4. On the hub $B^3$ of the piston $B$ is secured or formed a pulley $B^5$ for transmitting the rotary motion of the piston to other machinery. The peripheral surface of the piston $B$ is in contact with the inner surface of the cylinder $A$ at a packing $E$, held in a recess in the top of the said cylinder and adjustable toward the peripheral surface of the piston $B$ by two wedges $E'$ $E^2$, held to slide one upon the other and adjustable at their base ends by set-screws $E^3$ $E^4$, respectively screwing in the sides of the cylinder-heads $A'$ $A^2$, as is plainly illustrated in Fig. 2. The piston $B$ is provided with a plurality of piston-heads $F$ $F'$ $F^2$ $F^3$, as shown in the drawings, all pivotally connected at their inner ends with a crank-arm $C'$, formed or secured on the fixed shaft $C$.

Figure 1:
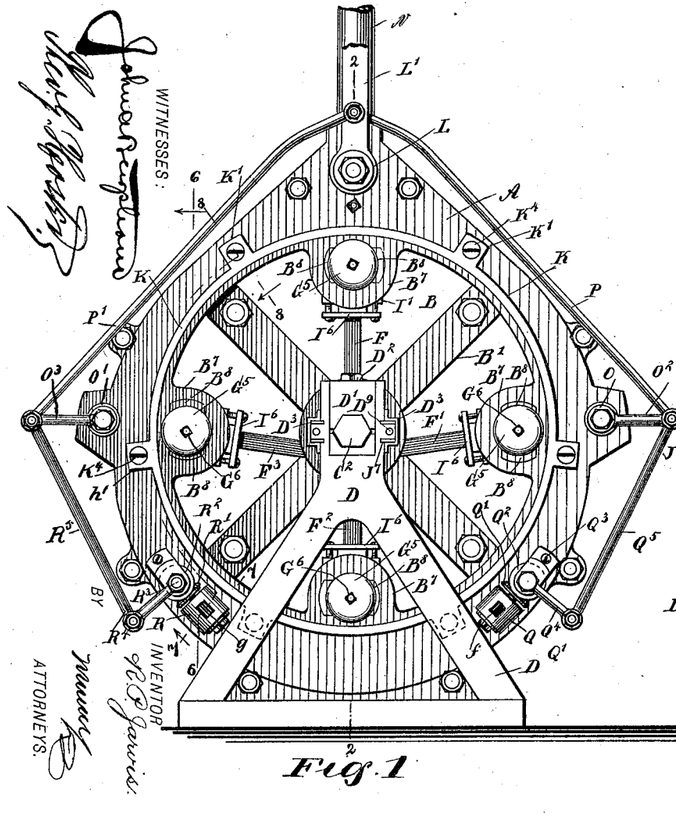
Figure 1 is an end elevation of the improvement.
Figure 3:
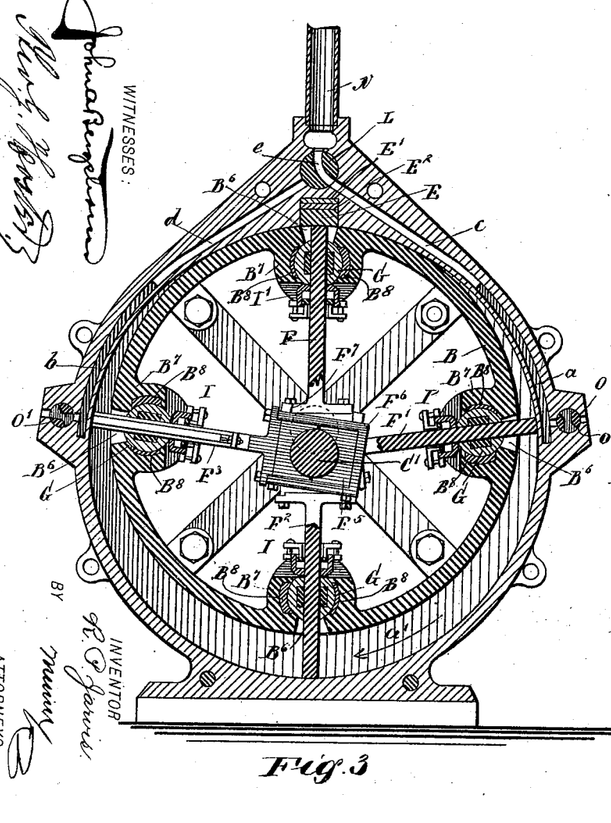
Fig. 3 is a transverse sectional elevation of the improvement on the line 3 3 of Fig. 2.

The piston-heads $F$ $F'$ $F^2$ $F^3$ extend through slots $B^6$ in the rim of the piston $B$, and each of the heads is fitted to slide in a trunnion $G$, mounted to rock in suitable bearings $B^7$, attached to or formed on the inside of the piston, as is plainly indicated in Figs. 1 and 3.

The inner end of each piston-head F F' F² F³ is provided with a sectional box F⁵, engaging the crank-arms C' and held adjustably in a frame F⁶, bolted or otherwise secured to a cross-arm on the corresponding piston-head. Wedges F⁷ are fitted to slide in the frame F⁶ against the boxes F⁵, so as to adjust the latter in the frame to take up wear of the boxes on the crank-arm.

Each of the piston-heads F F' F² F³ is provided on its sides with a packing (see Figs. 9 to 14) consisting principally of a guiding-plate H, adapted to abut with its outer straight face against the trunnion G, and on said plate are formed guideways H' for a second plate H², adapted to abut against the side of the piston-head F, the inner end of said plate being provided with a screw-rod H³, held on a bracket H⁴, attached to the piston-head, the said screw-rod being engaged by nuts H⁵, abutting against the said bracket to adjust the screw-rod and securely hold the plate H² outward to take up wear. The plate H² is provided with wedges H⁶, engaging correspondingly-shaped wedges H⁷ on the other plate H, so that when the screw-rod H³ and the plate H² are moved outward the wedges H⁶ and H⁷ slide upon one another to move the two plates H and H² apart and take up all wear at the side edges of the piston-heads and the corresponding trunnion G.

Figures 9, 10, 11, 12, 13, 14:
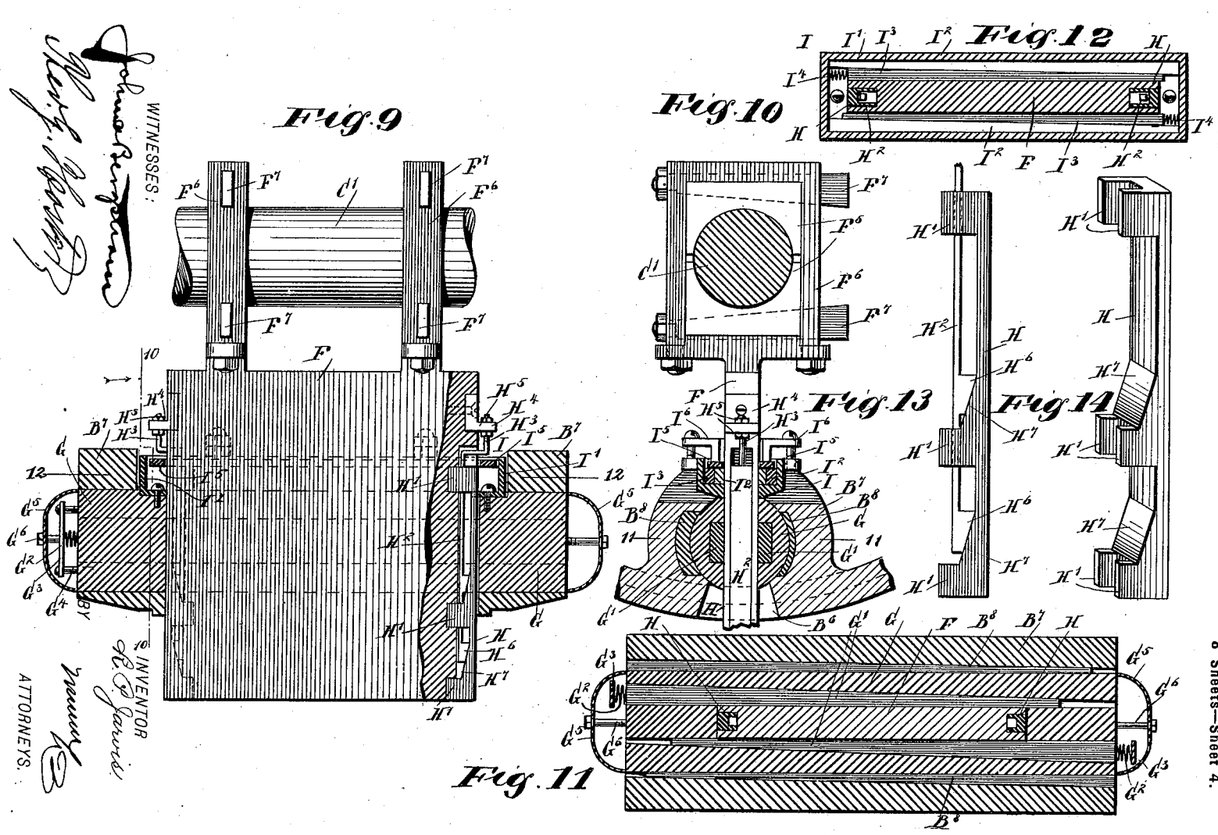
Fig. 9 is an enlarged side elevation of one of the piston-heads, its trunnion and crank-shaft, with parts in section.
Fig. 10 is an end elevation of the same with parts in section on the line 10 10 of Fig. 9.
Fig. 11 is a sectional plan view of the same on the line 11 11 of Fig. 10.
Fig. 12 is a similar view of the same on the line 12 12 of Fig. 9.
Fig. 13 is an enlarged side elevation of the packing for the side of the piston-head.
Fig. 14 is a perspective view of one member of the said packing.
Figures 15, 16, 17:
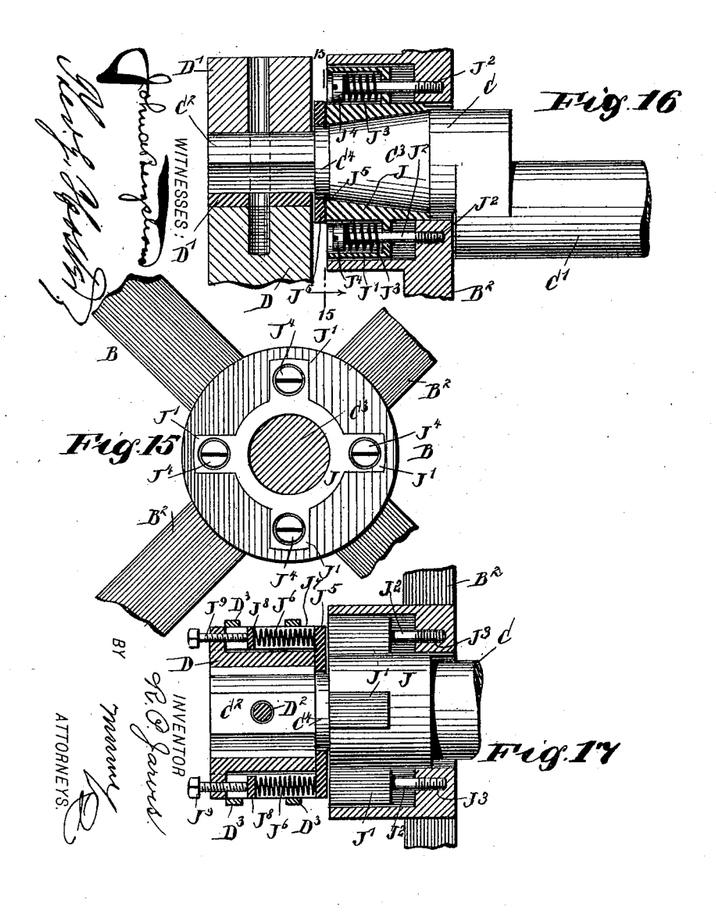
Fig. 15 is an enlarged cross-section of part of the piston and the crank-shaft, the section being on the line 15 15 of Fig. 16.
Fig. 16 is a sectional side elevation of the same.
Fig. 17 is a sectional plan view of the same.
Figure 18:
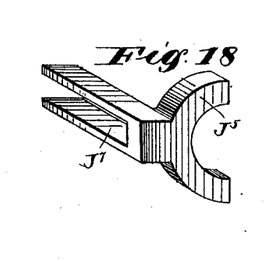
Fig. 18 is an enlarged perspective view of one of the packing members.
Figure 19:
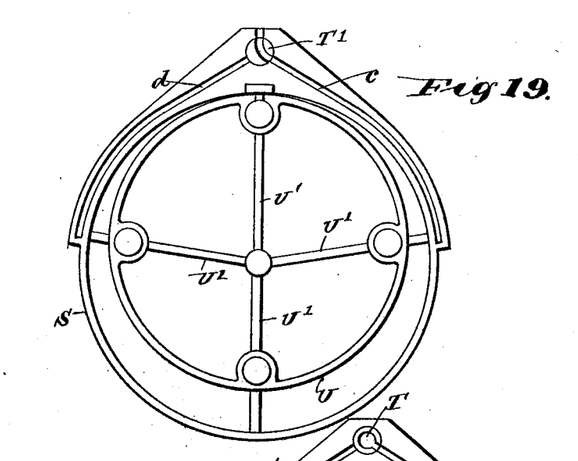
Fig. 19 is a diagrammatic view of the high-pressure cylinder, its piston, and piston-head.
Figure 20:
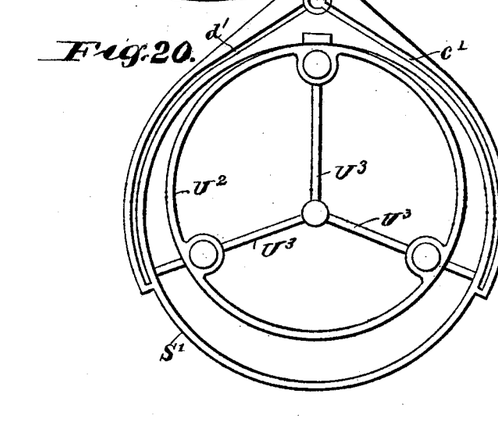
Fig. 20 is a similar view of the low-pressure cylinder, piston, and piston-heads.

Each of the trunnions G is provided on opposite faces of the piston-head F with wedge-shaped packings G', having their base ends extending from opposite ends of the trunnion, as plainly indicated in Fig. 11, each packing G' being pressed on at the base or outer end by a spring G², abutting against a bearing-plate G³, carried by studs G⁴, screwed in the end of the trunnion G. The device just described is inclosed at each end of the trunnion by a dust-cap G⁵, fastened by a screw G⁶ to the trunnion. It is evident that wear on the faces of each piston-head is readily taken up by the wedge-shaped packings G', pressed inward by the springs G², as described. Wedge-shaped packings B⁸ are also arranged in the bearings B⁷ for the trunnions to engage the outer peripheral surface of the trunnions at opposite sides, as plainly indicated in Fig. 10, to take up wear of the trunnions in the bearings.

In order to prevent leakage of steam, each trunnion is provided at its inner face with a packing I for making a steam-tight joint between the trunnion and the piston-head, so that steam is not liable to leak from the cylinder past the piston-head to the inside of the piston and to the atmosphere. The packing I is provided with a casing I', bolted to the trunnion G', as shown in Fig. 9, and in the sides of the said casing are arranged wedges I², engaged by wedges I³, fitting against the faces of the piston-head, as is plainly shown in Fig. 12, said wedges I³ being somewhat less in length than the casing, their base ends being pressed on by springs I⁴, held in the ends of said casing I'. Thus the springs force the wedges I³ inward along the fixed wedges I², so as to form a steam-tight joint with the faces of the piston-heads to prevent leakage. The wedges I³ are held against outward movement by a rectangular open plate or ring I⁵, carried by brackets I⁶, bolted or otherwise fastened to lugs on the casing I'. (See Fig. 10.)

Each of the hubs B³ and B⁴ is provided with an internal bearing J, having a conical bore for fitting on the corresponding beveled part C³ of the crank-shaft C. (See Figs. 2, 15, 16, and 17.) Each bearing J is provided on its outside with boxes J', mounted to slide longitudinally on bolts J², secured to the corresponding hub B³ or B⁴. On each bolt J², within the box J', is coiled a spring J³, one end of which rests against the box J', the other end pressing against the head J⁴ of the bolt, so as to press the bearing inwardly to fit snugly upon the beveled part C³ of the crank-shaft C. By this arrangement all wear incident to the piston revolving on the stationary shaft C is taken up and an easy running assured.

The portion C⁴ of the shaft C between the beveled part C³ and the hexagonal end C² is cylindrical, (see Figs. 16 and 17,) and in this portion C⁴ is fitted loosely a sectional ring J⁵, pressed against the outer end of the bearing J by springs J⁶, held in guideways J⁷, fitted in bearings D³ in the standard D. Each spring has its outer end abutting against a plate J⁸, fitted to slide in the guideway J⁷ and adjusted therein by a screw J⁹, screwing in a lug on the standard D.

In order to pack the piston in the cylinder-heads A' A², I provide the following arrangement, special reference being had to Figs. 1, 2, 6, and 8: The outer ends B⁹ of the piston-rim are beveled externally, and each beveled end is engaged by a packing-ring K, made wedge-shaped in cross-section, and on the ring K are formed boxes K', fitted to slide longitudinally on bolts K², secured to the cylinder-heads A' or A². On each bolt K², within the corresponding box K', is coiled a spring K³, the inner end of which presses on the box K', the outer end abutting on the under side of the head K⁴ of the bolt K², so that the packing-ring is guided longitudinally on the bolts and pressed inwardly by the springs to insure a steam-tight joint between the piston-rim and the cylinder-heads.

In the cylinder A, on opposite sides of the packing E, are formed inlet-ports $a$ and $b$, opening into the interior of the cylinder at the heads A' A², as plainly indicated in Fig. 3, and forming corresponding recesses in said heads, as will be apparent by reference to the figure mentioned. The upper ends of the ports $a$ and $b$ connect with ports $c$ and $d$, respectively, adapted to be connected with a port $e$, formed in a valve L, mounted to turn in suitable bearings in the top of the cylinder A above the packing E. The valve-port $e$ is adapted to register with a steam or compressed-air inlet pipe N, leading from a boiler or other suitable source of motive-agent supply. On the stem of the valve L is secured a handle L′, under the control of the operator, for turning the said valve L either to cut off the supply from both ports $c$ and $b$ or to connect either of said ports with the steam-supply.

As shown in Fig. 3, the port $e$ registers with the steam-supply inlet and the port $c$, so that the motive agent can pass into the cylinder at the right-hand side thereof by way of the port $a$ to act on the piston-head F′ and turn the piston in the direction of the arrow $a'$. When it is desired to reverse the engine, the valve L is turned to connect the port $d$ with the supply-pipe N, so that the motive agent passes through the port $d$ and by way of the port $b$ into the cylinder A, at the left-hand side thereof, to act on the piston-head F³ and turn the piston in the inverse direction of the arrow $a'$.

Near the lower ends of the ports $a$ and $b$ are arranged exhaust-valves O O′, respectively, adapted to connect the said ports with the atmosphere, it being understood that when the valve L connects its port $e$ with the port $c$ then the valve O is closed, while the other exhaust-valve O′ is opened, so that the exhaust-steam in front of the piston-head passes into the port $b$ and by way of the valve O′ to the atmosphere. When the valve L is turned, as previously described, for reversing the engine, then the valves O O′ are simultaneously turned with it to open the valve O and to close the valve O′. Exhaust then takes place by way of the port $a$ and the valve O.

In order to turn the valves L, O, and O′ simultaneously, I provide the stems of the valves O O′ with arms O² O³, respectively, connected by links P P′ with the handle L′, so that when the operator turns the latter either to the right or to the left a simultaneous motion is given to the valves O O′ for the purpose mentioned.

Figure 5:
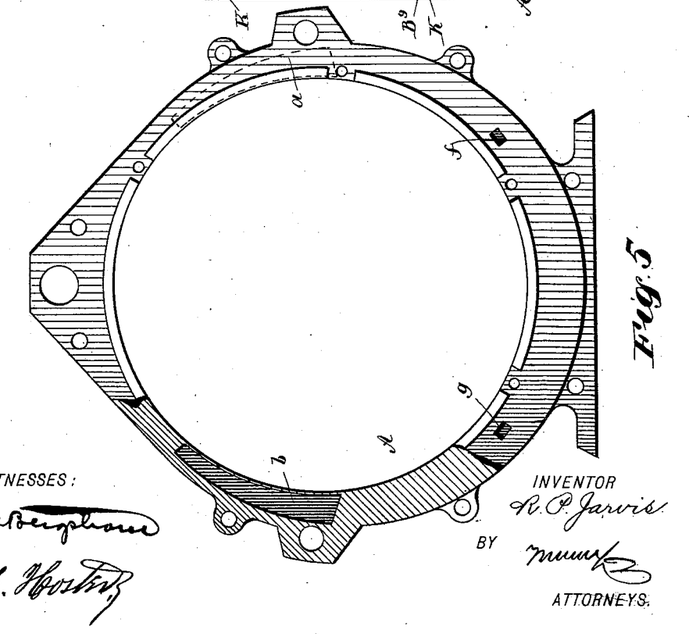
Fig. 5 is an end elevation of the cylinder with the cylinder-heads removed and parts in section.
Figure 6:
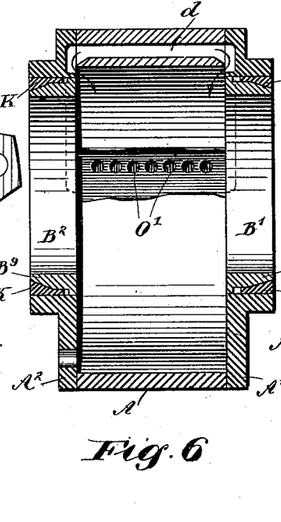
Fig. 6 is a sectional side elevation of the improvement on the line 6 6 of Fig. 1.
Figure 7:
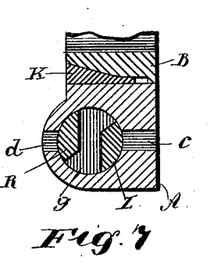
Fig. 7 is an enlarged cross-section of one of the auxiliary exhaust-valves in a closed position.
Figure 8:
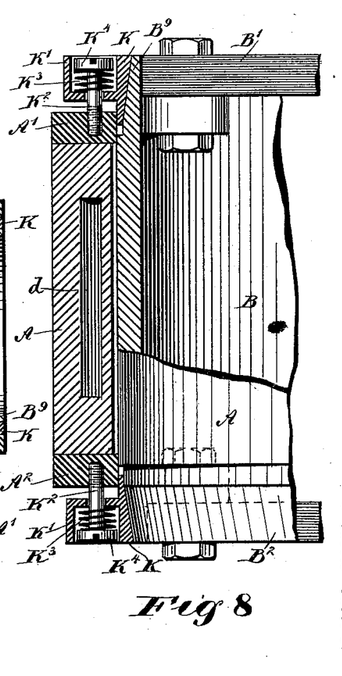
Fig. 8 is an enlarged sectional plan view of the improvement on the line 8 8 of Fig. 1.

In order to utilize the steam expansively, the ports $a$ and $b$ are extended a suitable distance on the sides of the cylinder A, as is plainly shown in Fig. 3, so that live steam can pass into two compartments in the front and rear of a piston-head and act simultaneously on two piston-heads for awhile, until the preceding piston-head passes the end of the corresponding port to cut off the steam from the preceding working chamber and allow the steam to operate expansively therein until the first piston-head passes the additional exhaust-ports $f$ and $g$, leading to the exhaust-valves Q and R, respectively, mounted to turn in suitable bearings attached to the cylinder A. (See Figs. 1, 5, and 7.)

The valves Q and R are provided on their valve-stems with bevel gear-wheels Q′ R, in mesh with bevel gear-wheels Q² and R², having their shafts Q³ and R³ provided with arms Q⁴ and R⁴, connected by links Q⁵ and R⁵ with the arms O² O³ of the exhaust-valves O O′. Now when the valves L O O′ are in the position shown in Fig. 3 then the valve Q is closed, while the other valve R connects the interior of the cylinder A, by the port $g$, with the atmosphere to allow steam to escape at this point from the cylinder—that is, between the piston-heads F² and F³. When the head F² has passed the port $g$, the exhaust-steam between the heads F′ F² is exhausted through the valve R after the steam has operated expansively against the head F², as previously mentioned. When the valves L O O′ are shifted, as previously explained, to reverse the engine, then the valve R is closed and the valve Q is opened to connect the interior of the cylinder A, by way of the port $f$, with the atmosphere. The same operation now takes place, only in a reverse order—that is, the steam is exhausted through the valve Q after it has operated expansively against the lowermost piston-head.

Figure 21:
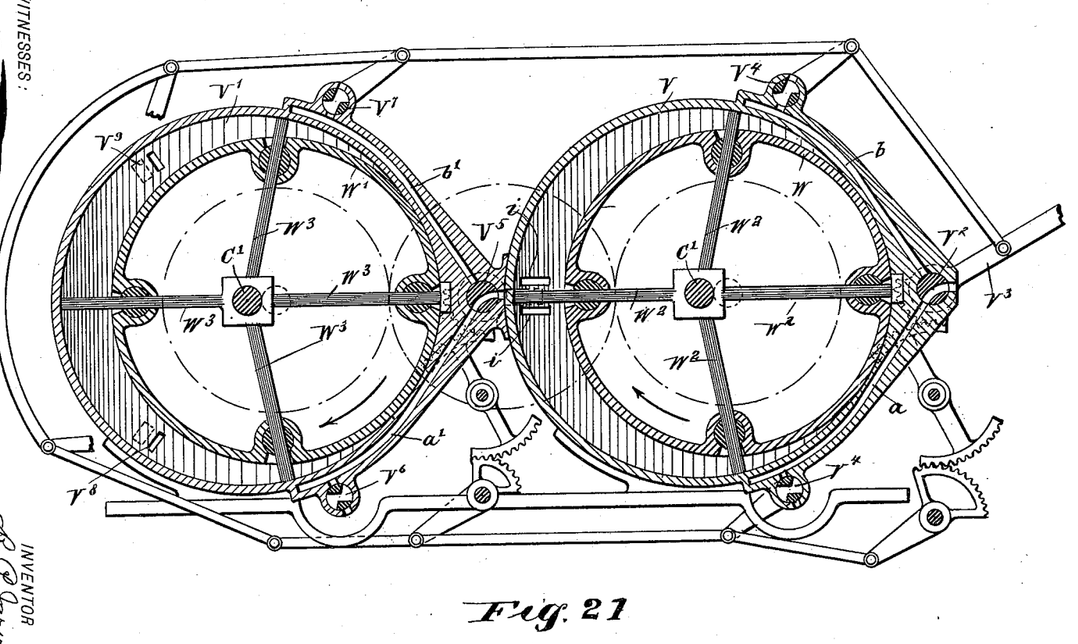
Fig. 21 is a sectional side elevation of a modified form of the improvement arranged as a duplex compound engine.

In the modified form shown in Fig. 21 a high-pressure cylinder V is placed alongside a low-pressure cylinder V′, and in said cylinders operate eccentrically the pistons W W′, having four piston-heads W² W³. An inlet-valve V² carries a reversing lever or handle V³ for directing the steam into either the lower or upper portion of the cylinder, and exhaust-valves V⁴ V⁴ are provided, operating in unison with the valve V², as previously described. The steam operates expansively in the cylinder V, and the main exhaust-steam passes diametrically opposite the inlet-valve V², by ports $i$, to the inlet-valve V⁵ of the low-pressure cylinder V′. The latter is provided with two sets of exhaust-valves V⁶ V⁷ and V⁸ V⁹ in connection with the valve V⁵ and the same as the valves L, O, O′, Q, and R, previously described. All of the valves of the cylinder V′ are connected with the valves of the cylinder V, so that upon shifting the reversing-lever V³ all the valves of both cylinders are shifted simultaneously. The mechanism for connecting the valves with each other may be of any approved construction, and the one shown is so apparent in its workings that further description is not deemed necessary.

The ports $i$ and V⁸ (represented in Fig. 21) are auxiliary ports, whereby steam may be turned into both engines from the boiler at the same time. In this way high-pressure work may be done in all the low-pressure cylinders. The boiler connections, &c., are independent of the other levers and inlet-port. Thus, for instance, if the port $i$ on the lower side of the high-pressure engine (shown in Fig. 21) is open and also the port V⁸ in the cylinder V′, then it is obvious that high-pressure work is done in both cylinders. If the engine be reversed and the ports on the upper side be opened, the action would be the same, except in an inverse direction. All I claim on this is a set of auxiliary ports made to register with the boiler by means of any approved valve, inlet-port, and leverage connections. The ports are designed to be used principally in starting heavy loads. By this means all the low-pressure engines may be used simultaneously as high-pressure engines, or the auxiliary ports may be dispensed with and low-pressure work be done in the usual manner. These ports, it will be understood, are opened and closed by valves independent of the other valve mechanism, likewise the feed pipe or pipes and levers.

Figure 22:
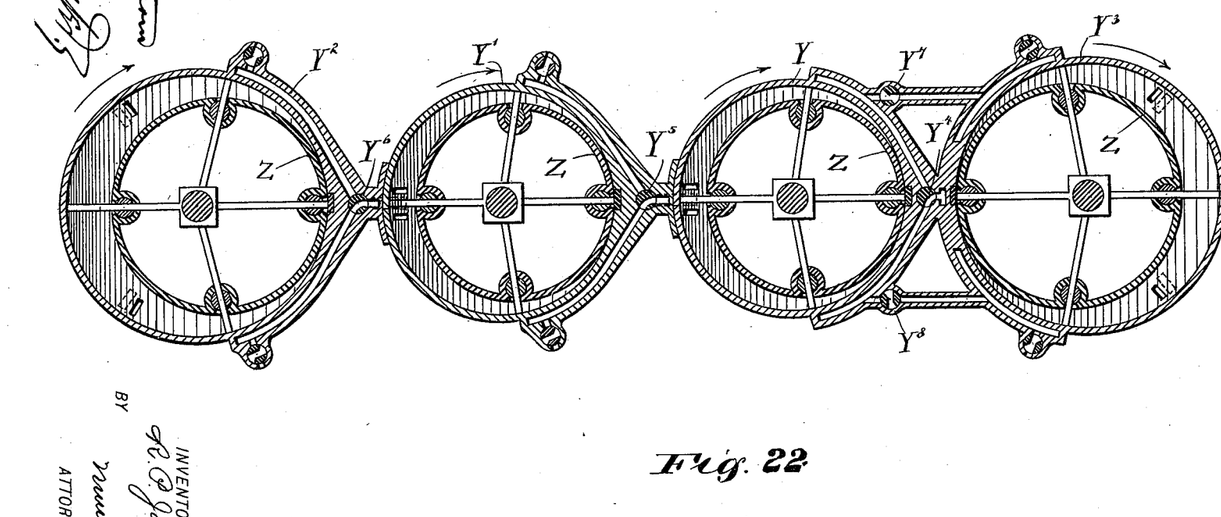
Fig. 22 is a similar view of another modified form of the improvement arranged as a quadruplex engine.

As shown in Fig. 22, the compound engine is provided with a high-pressure cylinder Y and three low-pressure cylinders Y', Y², and Y³, each containing a piston Z, having a plurality of piston-heads. The inlet-valve Y⁴ for the high-pressure cylinder Y directs the live steam either to the lower or top portion of the cylinder, according to the direction in which the engine is to be run. The high-pressure cylinder Y connects with the low-pressure cylinder Y' by way of a reversing-valve Y⁵, the same as the one described in reference to Fig. 21. The low-pressure cylinder Y' connects in a like manner by the reversing-valve Y⁶ with the second low-pressure cylinder Y², similar to the cylinders A and V' above referred to. The exhaust-valves Y⁷ and Y⁸ of the high-pressure cylinder Y connect with the third cylinder Y³, so that the final exhaust-steam not passed from the cylinder Y to the cylinder Y' is allowed to pass into the cylinder Y³ to do work therein in the same manner as the steam in the cylinder Y². As only a portion of the steam passes from the cylinder Y into the cylinder Y' and the remainder into the cylinder Y³ it is evident that the cylinder Y' can be of the same size as the cylinder Y, and yet the steam will work expansively therein. Further cylinders could be connected with the cylinders Y', Y², and Y³, if desired, to receive the exhaust-steam for more work.

From the foregoing it will be seen that the engine is very simple, compact, and durable and the strain and friction are equally distributed through the engine. The several parts are easy of access, and the inlet and exhaust ports can be made sufficiently large without perceptibly affecting the efficiency. As the engine has no continuously-working valves and the steam flows constantly it is evident that the engine can be easily governed and is capable of attaining an extremely high rate of speed. The engine is easily reversed and runs one way as well as the other. In stopping a load, or, for instance, in lowering carriages into mines, the reverse-lever L' is turned so as to draw on a vacuo as much as desired, or it can be turned so as to compress the air in the cylinder-compartments to the necessary compression to hold the load, the degree of compression being regulated by the reverse-lever. By a specially-devised mechanism this compressed air may be stored in the air-chamber and used to help in hoisting the next load.

Having thus fully described my invention, I claim as new and desire to secure by Letters Patent—

1. In a rotary engine, the combination of a cylinder provided with inlet-ports $a\ b$ extending down on opposite sides of the cylinder and having their lower ends terminating at about the transverse center thereof, and ports $c\ d$ with which the upper ends of the ports $a\ b$ connect, a piston eccentrically mounted in the cylinder, piston-heads sliding in the piston, the inlet-valve L at the top of the cylinder and provided with the port $e$ adapted to register with either of the ports $c\ d$, and exhaust-valves O O' on diametrically opposite sides of the cylinder near the lower ends of the ports $a\ b$ and adapted to connect said lower ends of the ports with the atmosphere, substantially as described.

2. In a rotary engine, the combination of a cylinder provided with inlet-ports $a\ b$ extending down on opposite sides of the cylinder and having their lower ends terminating at about the transverse center thereof, and ports $c\ d$ with which the upper ends of the ports $a\ b$ connect, the inlet-valve L at the top of the cylinder and provided with the port $e$ adapted to register with either of the ports $c\ d$, a shaft having a crank-arm in the cylinder, a piston eccentrically mounted in the cylinder on the shaft and having its rim slotted, rocking bearings carried by the piston, piston-heads sliding in said bearings and having their inner ends pivotally connected with the crank-arm of the said shaft, exhaust-valves O O' on diametrically opposite sides of the cylinder near the lower ends of the ports $a\ b$ and adapted to connect said ports with the atmosphere, and a connection between the inlet-valve and the exhaust-valves, substantially as described.

3. A rotary engine, comprising a cylinder having an inlet-port and two open exhaust-ports, a fixed shaft having a crank-arm extending in said cylinder, a piston eccentrically mounted in the cylinder and turning loosely on said shaft, rocking trunnions on said piston, piston-heads fitted to slide in said trunnions in slots in the piston-rim, the inner ends of said piston-heads being pivotally connected with the crank-arm of said fixed shaft, said heads being adapted to successively pass said parts so that live steam is taken at the inlet-port, a portion of the steam being exhausted at the first exhaust-port and the remainder at the last exhaust-port, and a low-pressure cylinder into which passes the steam from the first exhaust-port, said cylinder being provided with inlet and exhaust ports and connecting a piston and piston-heads similar to the one in the first-named cylinder, substantially as shown and described.

4. A rotary engine provided with a movable piston-head, a trunnion through which passes said head, packings for the edges of said head, and comprising two packing-plates having wedges fitted to slide upon one another, to move the packing-plates apart, one of the plates being guided in the other, and means for adjusting one of the plates longitudinally on the other, substantially as shown and described.

5. A rotary engine provided with a rocking trunnion, a piston-head fitted to slide therein, and spring-pressed packing-wedges interposed between the faces of the piston-head and the walls of the trunnion-opening through which passes the said head, substantially as shown and described.

6. A rotary engine provided with a rocking trunnion, a piston-head fitted to slide therein, spring-pressed packing-wedges interposed between the faces of the piston-head and the walls of the trunnion-opening through which passes the said head, and dust-caps secured to the ends of the trunnions to protect the trunnion-opening and wedges against dust, substantially as shown and described.

7. A rotary engine provided with a rocking trunnion, a piston-head fitted to slide therein, and a packing for the inner end of the said head and carried externally by said trunnion, substantially as shown and described.

8. A rotary engine provided with a rocking trunnion, a piston-head fitted to slide therein, a packing for the inner end of the said head and carried externally by said trunnion, said packing comprising a box having an opening in its bottom for the passage of said head, fixed and slidable wedges in said box, the slidable wedges being spring-pressed and engaging the faces of said head, and retaining-plates removably carried by said box, and engaging said wedges to hold the same in the box, substantially as shown and described.

9. A rotary engine provided with a movable piston-head having its end provided with a detachable frame, boxes held to slide in the frame, and keys for adjusting said boxes, substantially as shown and described.

10. A rotary engine provided with a fixed shaft having conical bearing portions, and a piston mounted to turn on the shaft, and having its hubs provided with longitudinally-yielding bearings fitted on the said conical bearing portions, substantially as shown and described.

11. A rotary engine provided with a fixed shaft having conical bearing portions, a piston mounted to turn on the shaft, and having its hubs provided with longitudinally-yielding bearings fitted on the said conical bearing portions, each bearing being provided with boxes or pockets secured to the hubs, and extending into the boxes for the bearings to slide on the bolts, and springs coiled on said bolts within the boxes, for pressing the boxes and the bearings inward, substantially as shown and described.

12. A rotary engine provided with a fixed shaft having conical bearing portions, a piston mounted to turn on the shaft, and having its hubs provided with longitudinally-yielding bearings fitted on the said conical bearing portions, and a spring-pressed sectional dust-ring engaging the outer end of said bearing, and fitted to slide in stationary bearings on the engine frame or standard, substantially as shown and described.

13. A rotary engine provided with a fixed shaft having conical bearing portions, a piston mounted to turn on the shaft, and having its hubs provided with longitudinally-yielding bearings fitted on the said conical bearing portions, a spring-pressed sectional dust-ring engaging the outer end of said bearing, and fitted to slide in stationary bearings on the engine frame or standard, and means for adjusting the tension of the springs for the said dust-ring, substantially as shown and described.

REUBEN PALMER JARVIS.

Witnesses:
L. L. JONES,
W. R. MYERS.